United States Patent [19]
Zeidler et al.

[11] Patent Number: 5,612,876
[45] Date of Patent: Mar. 18, 1997

[54] DEVICE FOR DETECTING SEAT OCCUPANCY IN A MOTOR VEHICLE

[75] Inventors: Falk Zeidler, Sindelfingen; Volker Petri, Aidlingen; Reinhold Mickeler, Altdorf; Michael Meyer, Sindelfingen, all of Germany

[73] Assignee: Mercedes-Benz AG, Stuttgart, Germany

[21] Appl. No.: 399,714

[22] Filed: Mar. 3, 1995

[30] Foreign Application Priority Data

Mar. 3, 1994 [DE] Germany .......................... 44 06 897.2

[51] Int. Cl.⁶ .................................................... B60R 21/32
[52] U.S. Cl. ............................. 364/424.055; 280/730.1; 280/735; 340/667; 180/273
[58] Field of Search ........................ 364/424.05; 340/436, 340/438, 669, 667; 307/10.1; 180/273, 274, 282; 280/730.1, 734, 735

[56] References Cited

U.S. PATENT DOCUMENTS

| | | | |
|---|---|---|---|
| 5,010,774 | 4/1991 | Kikuo et al. | 73/862.04 |
| 5,074,583 | 12/1991 | Fujita et al. | 280/735 |
| 5,161,820 | 11/1992 | Vollmer | 340/667 |
| 5,413,378 | 5/1995 | Steffens, Jr. et al. | 280/735 |
| 5,454,591 | 10/1995 | Mazur et al. | 280/730.1 |
| 5,466,001 | 11/1995 | Gotomyo et al. | 280/730.1 |
| 5,474,327 | 12/1995 | Schousek | 280/730.1 |
| 5,494,311 | 2/1996 | Blackburn et al. | 280/730.1 |

FOREIGN PATENT DOCUMENTS

| | | |
|---|---|---|
| 0357225 | 3/1990 | European Pat. Off. . |
| 2125198 | 11/1972 | Germany . |
| 4237072 | 12/1993 | Germany . |

*Primary Examiner*—Gary Chin
*Attorney, Agent, or Firm*—Evenson, McKeown, Edwards & Lenahan, P.L.L.C.

[57] ABSTRACT

A device for detecting seat occupancy in a motor vehicle, especially for inhibiting airbag release when a seat is unoccupied, is provided. A seat occupancy sensor has a front sensing region and a rear sensing region, which can be evaluated separately. In this way, it is possible to determine whether the front seat passenger is in a sitting position close to the front seat edge of the seat cushion, which reduces the protective effect of the airbag. This can possibly be indicated visually or audibly. As a further measure, the inhibiting of an airbag release can be provided in the case of an incorrect sitting position. The seat occupancy sensor can be a resistive membrane pressure sensor.

15 Claims, 2 Drawing Sheets

DEVICE FOR DETECTING SEAT OCCUPANCY IN A MOTOR VEHICLE

BACKGROUND AND SUMMARY OF THE INVENTION

The invention relates to a device for detectin occupancy for a motor vehicle and, more particularly, to a device for detecting seat occupancy for a motor vehicle, especially for inhibiting airbag release when the seat is unoccupied. The device has a seat occupancy sensor, which is integrated in a seat cushion, and an associated evaluation circuit.

In order to protect vehicle occupants more effectively, motor vehicles, inter alia, are being equipped to an increasing extent with a front seat passenger's airbag. In doing so, no unnecessary damage occurs provided it is possible to release the front seat passenger's airbag in the case of an accident only when the front seat passenger's seat is occupied.

A number of systems for seat occupancy detection are known. Thus, in German Patent document DE-AS 21 25 198, a contact band is integrated into the seat cushion of the motor vehicle seat. Two contact strips of the contact band come into contact when loaded. This contact making is evaluated as a signal for the loading of the seat cushion. The seat occupancy detection can be carried out using contact bands of various patterns, as a result of which locally different sensitivities are achieved.

An embodiment for seat occupancy detection, which furthermore allows locally resolved evaluation of the load, is known from U.S. 5,010,774. In this reference, a matrix of pressure-sensitive contact points is evaluated in order to detect the load on the backrest of a seat by a trial person as a function of different designs of the seat. Furthermore a trial shoe is known from the document, having a pressure-sensitive bottom, in the case of which the pressure load on the running sole and the step can be separately evaluated.

In German Patent document DE 42 37 072 C1, a sensor mat is described for installation in the seat cushion of a motor vehicle seat. The sensor mat is constructed as a resistive membrane pressure sensor and, in addition to interrogation of the seat occupancy status, also allows simple interrogation of the functional status, i.e., a self check.

The known systems for detecting seat occupancy signal the seat occupancy independently of the sitting position of the occupant. As a result, airbag release is also allowed independently of the sitting position. However, it is advantageous for an optimum impact-damping effect of the airbag if a minimum distance is ensured between the occupant and the airbag at the start of the airbag release, in order for there to be sufficient time for the airbag to unfold in the case of an accident.

There is therefore needed a system for detecting seat occupancy such that an incorrect sitting position (out of position) close to the front seat edge, in the case of which the minimum distance mentioned above is not maintained, can be detected and the occupant warned.

This need is met by a device for detecting seat occupancy for a motor vehicle and, more particularly, to a device for detecting seat occupancy for a motor vehicle, especially for inhibiting airbag release when the seat is unoccupied. The device has a seat occupancy sensor, which is integrated in a seat cushion, and an associated evaluation circuit. The seat occupancy sensor is divided into a front sensing region and a rear sensing region. The front sensing region responds to seat occupancy in the front region of the seat cushion and the rear sensing region responds to seat occupancy in the rear region of the seat cushion. It is possible to evaluate the occupancy state of both sensing regions separately. By splitting the sensitive region of the seat occupancy sensor into a front sensing region and a rear sensing region, a sitting position close to the front seat edge can be detected and an appropriate warning signal emitted.

This measure makes particular sense if, despite the warnings in the operating instructions from the vehicle manufacturer, children are seated on the front seat without there being a suitable child restraint system. Because of their shorter thighs, small children prefer to sit on the front seat surface for added comfort. Using the device according to the invention for seat occupancy detection, in conjunction with an audible or visual warning device, the driver can be emphatically advised to ensure that the front seat passenger is in a correct sitting position.

Other objects, advantages and novel features of the present invention will become apparent from the following detailed description of the invention when considered in conjunction with the accompanying drawings.

DETAILED DESCRIPTION OF THE DRAWINGS

Figure 1:
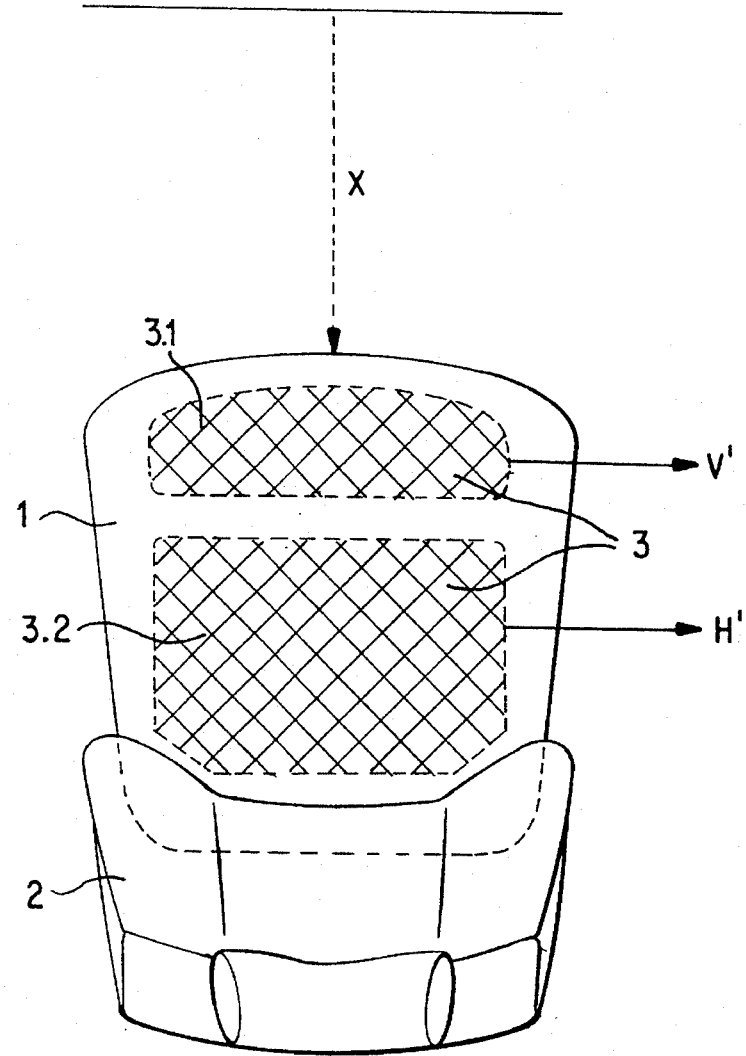
FIG. 1 is a diagram of the seat occupancy sensor according to the present invention.

FIG. 1 shows a top plan view of a driver's seat having a seat cushion 1 and a backrest 2. Furthermore, a seat occupancy sensor 3 and an arrangement of two sensing regions 3.1, 3.2 over the seat cushion 1 are illustrated. It is possible to combine the two sensing regions 3.1, 3.2 in one mechanical structural unit (sensor mat). The front sensing region 3.1 detects seat occupancy on the front region of the seat, close to the seat edge, and emits a corresponding signal V'. In an analogous manner, the rear sensing region 3.2 detects seat occupancy in the rear region, close to the backrest 2, and emits a corresponding signal H'. It is, of course, easily possible also to provide a further sensing region in the backrest 2, which would be included for evaluation.

The precise geometry of the sensing regions 3.1, 3.2 and their delineation from one another must be optimized individually in a trial for each vehicle type and seat type. It also is necessary to reliably detect seat occupancy by a child. The seat occupancy sensor 3 can be implemented as a resistive membrane pressure sensor, or can be based on the principles on which other known seat occupancy sensors are based.

In one embodiment, it is possible to provide that an adjustable longitudinal sitting position "x" of a seat is also detected and interrogated, for absolute determination of the center of gravity position of the occupant with respect to the vehicle and thus with respect to the airbag. The longitudinal sitting position x can be detected by a position sensor or switch as is known, for example, from seat memory circuits.

Figure 2:
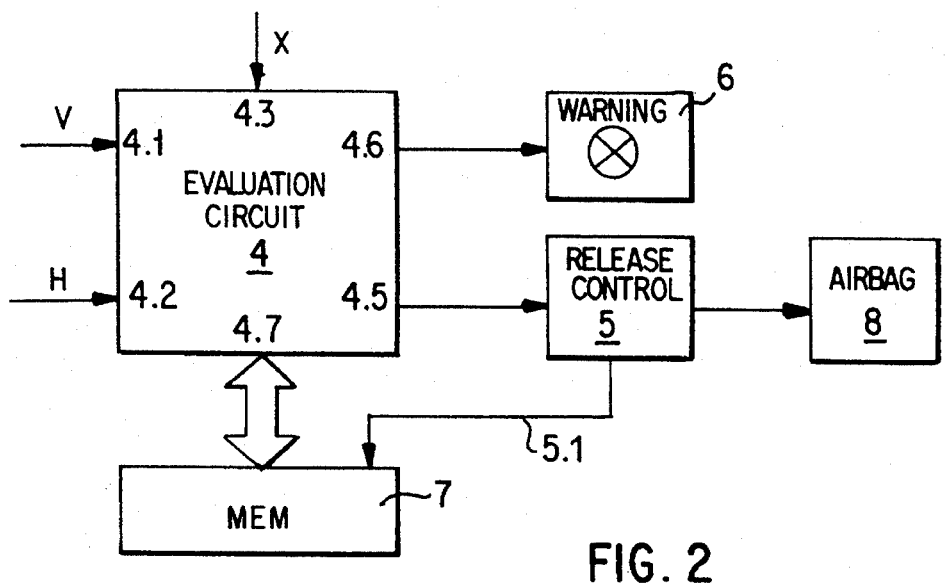
FIG. 2 is a schematic block diagram of the evaluation circuit according to the present invention.

FIG. 2 shows the evaluation circuit 4 according to the invention, having an input 4.1 for a first seat occupancy signal V which is assigned to the front sensing region, and an input 4.2 for a second seat occupancy signal H which is assigned to the rear sensing region. The seat occupancy signals V and H are provided, for example, by the signals V' and H' respectively from FIG. 1. In a development, an input 4.3 for the longitudinal sitting position x can also be provided. The evaluation circuit determines from the input signals a control signal 4.5 by means of which a release controller 5 for an airbag 8 is driven in such a manner that release is allowed when the sitting position is correct. Furthermore, the evaluation circuit 4 determines from the input signals a warning signal 4.6 which drives a warning device 6 and is emitted when an incorrect sitting position (out of position) has been assumed. The warning device 6 may comprise an audible or visual indication. The evaluation circuit can be implemented via a hardwired circuit or a suitably programmed microprocessor.

In a preferred embodiment, it can be provided that the evaluation circuit 4 enters data via an interface 4.7 into a non-volatile memory 7 (MEM). This data can be, for example, the input signals 4.1–4.3 or the output signals 4.5, 4.6. In this way, it is intended to make it possible to reconstruct the sitting position of the occupant and the measures derived from the evaluation circuit 4 therefrom, for example the emission of a warning signal 4.6, after an accident has occurred. It is thus sufficient to use a stacking memory (stack) for the memory 7, in which case relatively old data are cyclically overwritten by relatively new data, so that less memory space is required overall. An inhibiting signal 5.1, which is passed to the memory from the release controller 5 at the time of airbag release, ensures that the memory 7 can no longer be overwritten after a crash and that therefore the data can still be read out only by a suitable person. Further overwriting of the data is thus impossible after airbag release.

The evaluation which is carried out in the evaluation circuit 4 is described in the following text with reference to a simple algorithm that can be performed on a microprocessor. For simplicity, it is assumed that the seat occupancy signals V and H are logic signals having the occupancy status "1" for an occupied sensing region and "0" for an unoccupied sensing region. A total of four occupancy combinations are thus possible for the front sensing region and the rear sensing region overall, which combinations are illustrated in the following table:

| V | H | Occupancy situation | Measure |
|---|---|---|---|
| 0 | 0 | Seat unoccupied | A |
| 0 | 1 | Seat correctly occupied | B |
| 1 | 0 | Seat incorrectly occupied (out of position) | C |
| 1 | 1 | Seat correctly occupied | B |

The first column always shows the occupancy status of the seat occupancy signal V for the front sensing region, and the second column the seat occupancy signal H for the rear sensing region. The third column explains the corresponding occupancy situation, and the fourth column shows the measures derived therefrom.

Measure A accordingly occurs when the seat is unoccupied. In this measure, the control signal 4.5 inhibits the release controller 5, so that it is not possible for the airbag 8 to be released.

Measure B occurs when the seat is correctly occupied. In this measure, the control signal 4.5 causes the release controller 5 to be ready to release the airbag.

Measure C occurs in the case in which a seat is incorrectly occupied and includes at least the emission of a warning signal 4.6 to an audible or visual warning device 6. In addition, inhibition of airbag release can be provided in accordance with measure A, it then being possible to provide explicit advice by means of a display or warning symbol that the airbag is not ready to release.

This supplementary measure can be provided as an alerting measure if a differentiated evaluation of the sitting position is possible and it is clearly evident that an infringement of the minimum distance between the airbag and the occupant has been recorded.

In one embodiment, a differentiated determination of the sitting position can be achieved in that the center of gravity position of the occupant with respect to the seat is detected and evaluated more precisely and/or the longitudinal sitting position x is also included, in order to precisely determine the position of the occupant with respect to the airbag. Subject to these preconditions, it can also be provided for measure C to be split into two levels, so that if the distance between the airbag and the occupant is slightly less than the minimum distance, only a warning signal 4.6 is emitted, and the inhibition of airbag release in addition does not take place until the minimum distance has been considerably infringed. Alternatively, the determined absolute sitting position can be passed as a control signal 4.5 to the release controller 5, in order to influence the switching threshold for airbag release. It can thus be provided that the switching threshold for airbag release is increased the shorter the determined distance between the occupant and the airbag is.

Figure 3:
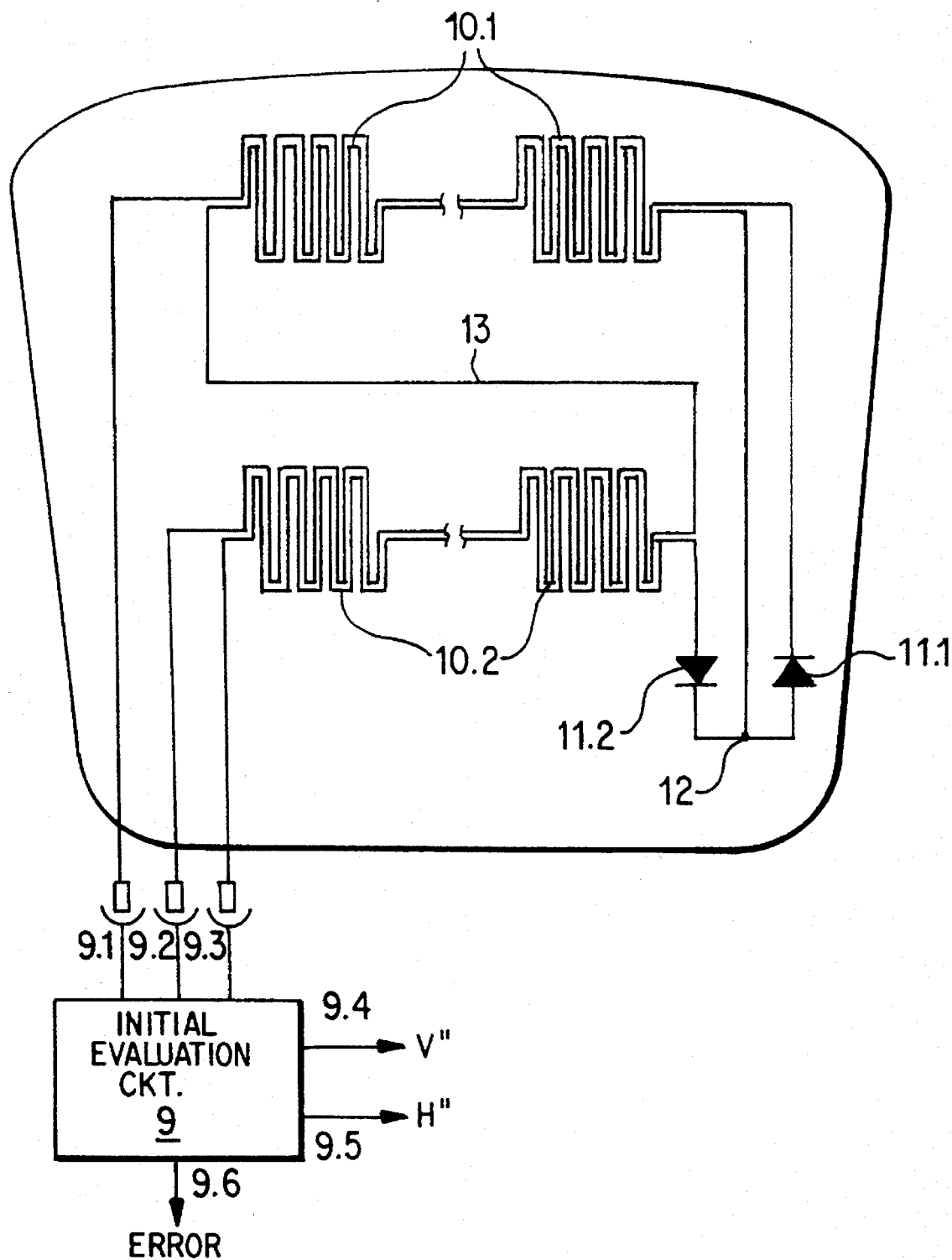
FIG. 3 is schematic diagram of a preferred embodiment of the seat occupancy sensor formed as a resistive membrane pressure sensor.

FIG. 3 illustrates a possible embodiment of the seat occupancy sensor according to the invention formed of a resistive membrane pressure sensor. The design is based on the principle described in German Patent document DE 42 37 072 C1. The membrane pressure sensor includes two polymer layers which are laminated together, one polymer layer being coated with a semiconductor material and the other with meandering double cables, which fill the pressure-sensitive region. When a pressure load is applied to the membrane pressure sensor, the semiconductor material connects closely adjacent conductor tracks of a double cable more or less in parallel, so that the electrical resistance between the conductor track reduce as the contact pressure increases. As a result of the conductor tracks being designed without branches, complete continuity testing of the conductor tracks is also possible, by means of which it is possible to check the serviceability of the sensor in a simple manner. If the double cable is terminated by a diode at its end, it is possible to use the polarity of the measurement voltage to determine whether a pressure load measurement or a continuity test of the conductor tracks is carried out. For a continuity test, the measurement current flows in the forward direction through the diode, as a result of which a circuit composed of the conductor tracks forming the double cable is closed. In the event of an interruption in a conductor track, the circuit for the measurement current is thus also interrupted.

FIG. 3 shows a plan view of the membrane pressure sensor according to the invention, having a first pressure sensor 10.1 for the front sensing region and a second pressure sensor 10.2 for the rear sensing region. The two pressure sensors 10.1, 10.2 are each formed by a meandering double cable, each double cable having a first conductor track and a second conductor track which runs predominantly parallel thereto. The respectively first conductor tracks of the two double cables are each connected at one of their ends to a connecting contact 9.1 or 9.3 respectively, and at their other end, in each case via a diode 11.1 or 11.2 respectively, to a junction point 12, the two diodes 11.1, 11.2 having opposite polarity. The respective second conductor tracks of the two double cables are connected in series and form a common cable 13, which is connected at one of its ends to a connecting contact 9.2 and at its other end to the junction point 12.

The interconnection according to the present invention of the total of four conductor tracks of the two pressure sensors 10.1, 10.2 in the manner illustrated in FIG. 3 offers the advantage that, using only three connecting contacts 9.1–9.3, it is possible to separately carry out both an interrogation of the occupancy states and a functional test of the two pressure sensors 10.1, 10.2. An initial evaluation circuit 9 is provided for this purpose, whose three inputs are connected to the connecting contacts 9.1–9.3 and which emits, via a first output 9.4, the seat occupancy signal V" for the front sensing region and, via a second output, the seat occupancy signal H" for the rear sensing region. Both seat occupancy signals V" and H" can drive, for example, the two inputs 4.1, 4.2 of the evaluation circuit 4 in FIG. 2. A third output 9.6 emits an error signal (ERROR), which emits the result of the continuity test. This error signal can be used, for example, to drive an indicating unit, which possibly advises the driver of a defect in the seat occupancy detection.

The following table illustrates how a pressure load measurement or a continuity test is in each case carried out as a function of the polarity of the measurement voltage on the connecting contacts 9.1–9.3, related to the front pressure sensor 10.1 (front) and the rear pressure sensor 10.2 (rear):

| Polarity on | | | |
| --- | --- | --- | --- |
| 9.1 | 9.2 | 9.3 | Measurement carried out |
| + | − | | Front pressure load measurement |
| − | + | | Front continuity test |
| | + | − | Rear pressure load measurement |
| | − | + | Rear continuity test |

In this way, it is possible to intrinsically check each of the two pressure sensors 10.1, 10.2 with respect to pressure load and serviceability.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for detecting seat occupancy states in a motor vehicle, the device comprising:

a seat occupancy sensor integrated in a seat cushion of the seat;

an evaluation circuit coupled to the seat occupancy sensor;

wherein said seat occupancy sensor is divided into a front sensing region and a rear sensing region, said front sensing region responding to seat occupancy in a front region of the seat cushion and the rear sensing region responding to seat occupancy in a rear region of the seat cushion; and wherein an occupancy state of both said front and rear regions is separately evaluated by said evaluation circuit to control an airbag.

2. A device according to claim 1, wherein when the seat occupancy is detected primarily in the front sensing region, the evaluation circuit emits a warning signal to at least one of an audible and visual warning device.

3. A device according to claim 1, wherein when the seat occupancy is detected primarily in the front sensing region, the evaluation circuit emits a control signal to a release controller for the airbag, said control signal making the release of the airbag more difficult.

4. A device according to claim 1, wherein when the seat occupancy is detected primarily in the rear sensing region, the evaluation circuit emits a control signal which makes a release controller for an airbag ready to release.

5. A device according to claim 1, wherein the evaluation circuit uses signals from the seat occupancy sensor and a longitudinal seat position of the vehicle seat to determine an absolute distance between an occupant and the airbag, and emits a warning signal if said absolute distance is less than a minimum distance.

6. A device according to claim 1, further comprising a non-volatile storage medium coupled to the evaluation circuit, said storage medium storing data which is input, output, or used internally in the evaluation circuit.

7. A device according to claim 6, wherein the storage medium is carried out in accordance with a stacking principle, in which case relatively old data in the storage medium are overwritten cyclically by relatively new data received in the storage medium.

8. A device according to claim 1, wherein the seat occupancy sensor is constructed as a resistive membrane pressure sensor.

9. A device according to claim 8, wherein the membrane pressure sensor is formed from a front pressure sensor and a rear pressure sensor, each of which has a meandering double cable, each double cable being formed from a first conductor track and a second conductor track which runs predominantly parallel thereto.

10. A device according to claim 9, further comprising three connecting contacts, wherein one end of said first conductor track of each of said double cables is connected to respective ones of said three connecting contacts, and another end is connected via respective diodes to a common junction point, wherein said second conductor tracks of said double cables are connected together to form a common cable having one end connected to another one of said three connecting contacts, and another end connected to said common junction point.

11. A device according to claim 1, wherein in addition to an interrogation of the occupancy state, a functional test for both sensing regions is separately carried out by said evaluation circuit.

12. A device according to claim 10, wherein an initial evaluation circuit is connected to the three connecting contacts, and wherein a measurement voltage having alternating polarity is in each case applied to two of said three connecting contacts, and further wherein seat occupancy signals for the front sensing region and for the rear sensing region are determined from the respective measurement currents, and still further wherein an error signal with respect to the operation of the seat occupancy sensor is determined from the respective measurement currents.

13. A device according to claim 1, wherein when the seat occupancy is detected primarily in the front sensing region, the evaluation circuit emits a control signal to a release controller for the airbag, said control signal inhibiting the release of the airbag.

14. A device for detecting seat occupancy states in a motor vehicle, the device comprising:

a seat occupancy sensor integrated in a seat cushion of the seat;

an evaluation circuit coupled to the seat occupancy sensor;

wherein said seat occupancy sensor is divided into a front sensing region and a rear sensing region, said front sensing region responding to seat occupancy in a front region of the seat cushion close to a front seat edge, and the rear sensing region responding to seat occupancy in a rear region of the seat cushion; and wherein an occupancy state of both said front and rear regions is separately evaluated by said evaluation circuit.

15. A device for detecting seat occupancy states in a motor vehicle, the device comprising:

a seat occupancy sensor integrated in a seat cushion of the seat;

an evaluation circuit coupled to the seat occupancy sensor;

wherein said seat occupancy sensor is divided into a front sensing region and a rear sensing region, said front sensing region responding to seat occupancy in a front region of the seat cushion close to a front seat edge, and the rear sensing region responding to seat occupancy in a rear region of the seat cushion;

wherein an occupancy state of both said front and rear regions is separately evaluated by said evaluation circuit; and whereby a response from only said front sensing region indicates an incorrect seat occupancy state for an airbag release.

* * * * *